No. 719,068. PATENTED JAN. 27, 1903.
W. N. WHITELY.
MOWING MACHINE.
APPLICATION FILED SEPT. 26, 1901.
NO MODEL. 4 SHEETS—SHEET 4.

WITNESSES: INVENTOR.
John L. Gilligan William N. Whitely
Robert Weiskotten

UNITED STATES PATENT OFFICE.

WILLIAM N. WHITELY, OF SPRINGFIELD, OHIO.

MOWING-MACHINE.

SPECIFICATION forming part of Letters Patent No. 719,068, dated January 27, 1903.

Application filed September 26, 1901. Serial No. 76,634. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Mowing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in mowing-machines, and particularly to the type known as the "direct-draft" type (by some designated the "draw-cut" type) and represented in Letters Patent No. 378,816, granted to William N. Whitely and William Bayley February 28, 1888. In this construction the cutting apparatus is drawn over the ground by means of a connecting draw-bar extending forward from the cutting apparatus and pivotally connected to the tongue of the machine, the cutting apparatus and its connecting parts being sustained from backward movement wholly by the draw-bar, there being practically but one connection with the cuttting-apparatus support to the main frame and one pivotal connection from said support with the tongue or some connecting part thereof. The propelling of the carriage part of the machine is effected by the direct hitch to the tongue. The propelling of the cutting apparatus and its connecting parts over the ground is effected by what I term the "draw-bar," which pivotally connects the tongue and cutting apparatus together, the propulsion of each being separate from the other. Preferably I employ a depending bracket rigidly attached to the tongue some distance in advance of the cutting apparatus and extending downward, to which the draw-bar is attached, so that the line of draft may be nearly parallel with the ground-line.

My improvements more particularly relate to the manner of handling the cutting apparatus of the type of machine shown that the operator may turn the cutting apparatus from a horizontal to a vertical position, and vice versa, by one operation of the lifting-lever while the machine is moving over the ground. In machines of this type it becomes necessary to disengage the driving-gearing or some connecting part thereof which operates the cutters before the cutting apparatus has reached an elevation where the cutters will not operate.

The type of machine shown with my improvements thereon is very desirable for cutting among trees or other high obstructions where it becomes necessary to frequently lift the cutting apparatus, so that the operator can quickly and easily turn the cutting apparatus to a vertical position while the machine is moving forward and return it to its working position on the ground without loss of time, and as it is not necessary for the cutters to operate in a vertical position when cutting grain or grass all the requirements for practical purposes are met in my application.

One object of my invention is to provide a mowing-machine employing a long pitman and having a direct draft in connection with the system for handling the cutting apparatus easily and quickly and means for automatic disengagement of the gearing mechanism that operates the cutters.

The meaning of a direct draft as applied to mowing-machines is that the cutting apparatus of a front-cut mowing-machine may be propelled the same as a rear-cut machine and that the inner driving-wheel will not lift off the ground when the cutting apparatus meets with resistance from any obstruction.

I attain these objects by the mechanism illustrated in the accompanying drawings, which form a part of this specification, in which—

Fig. 7ᵃ is a detail of the gear-disengaging fork.

Like parts are represented by similar reference-letters in the several views.

Referring to the drawings, A A represent the main driving-wheels. B is the main axle supported by said driving-wheels.

Figure 1:
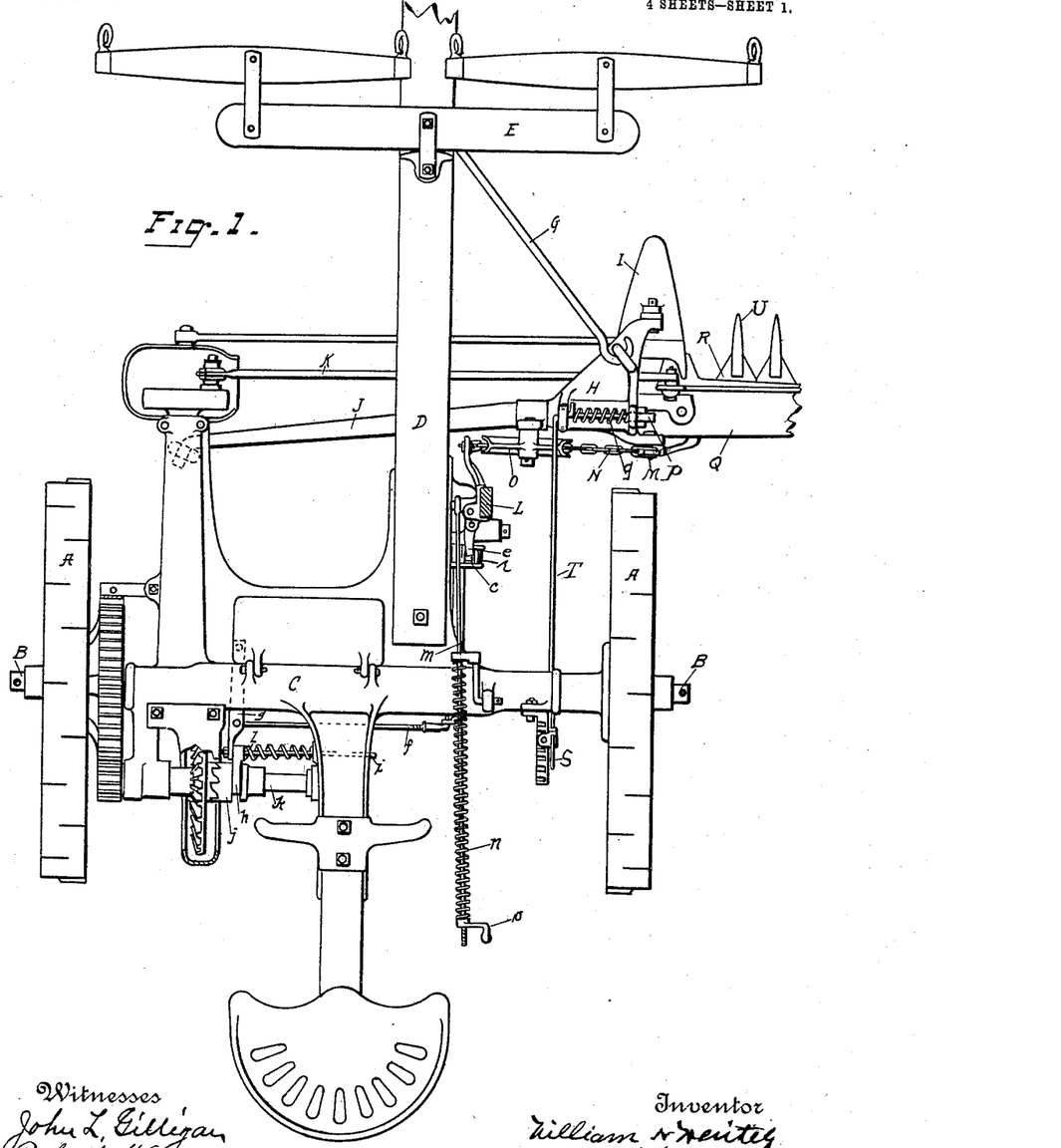
Figure 1 is a plan view of a mowing-machine embodying my invention.

C is the main frame, which forms a tubular bearing for the main axle-shaft B and carries substantially all the operating parts of the machine. To the frame C is rigidly attached the tongue D, which forms a support for the whiffletrees E and also forms a rigid support for the depending bracket F, as shown by Fig. 3, to which is pivotally connected the draw-bar G, which extends rearward from said bracket F, pivotally connected to the coupling-frame H, which is pivotally connected to the main shoe I, forward and rearward of the cutters, as shown in Figs. 1 and 3, forming a support for the inner end of the coupling-bar J, and rotative thereon and pivotally located across the path of the machine in rear of the driving-rod K, the outer end of said coupling-bar J pivotally connected to the main frame C.

Figures 2, 3, 4, 5, 6, 7, 7A, 8:
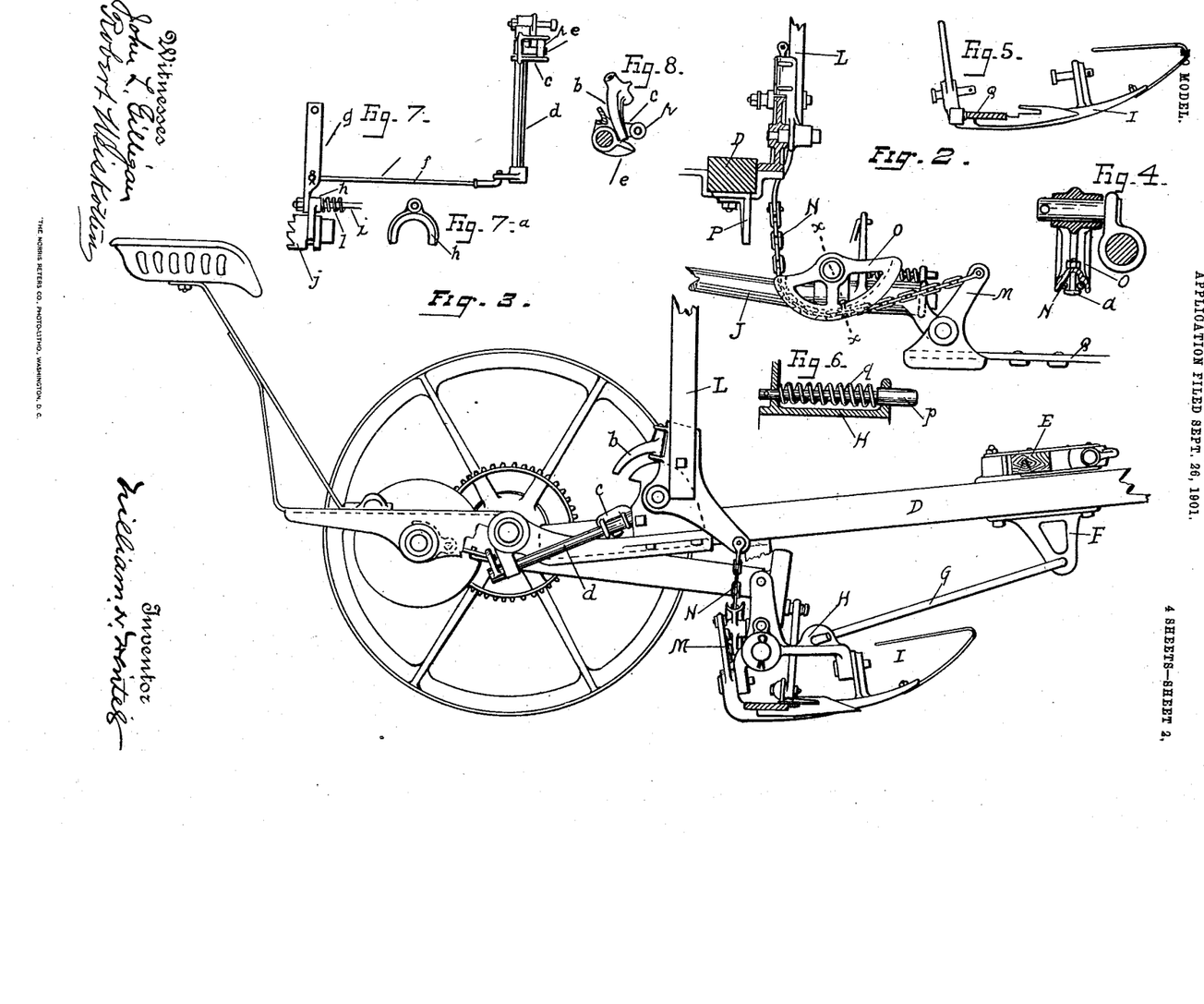
Fig. 2 is a rear elevation of a portion of a mowing-machine, showing the lifting mechanism, eccentric quadrant, and flexible connection between the cutting apparatus and lifting-lever.
Fig. 3 is a side elevation of a mowing-machine embodying my invention, showing the location of the longitudinally-disposed rock-shaft and its connections, also the lifting-lever and its connecting mechanism from the tongue or main frame to the cutting apparatus.
Fig. 4 is a cross-section of the eccentric quadrant, taken on the lines $x\,x$ of Fig. 2.
Fig. 5 is a detail side view of the inner shoe of the cutting apparatus.
Fig. 6 is a detail view of the yielding cutter-bar stop to bear against the cutter-bar when raised to a vertical position.
Fig. 7 is a detail plan view showing the longitudinally-disposed rock-shaft, the inseparable apertured bracket and toe, and the gear-disengaging mechanism.
Fig. 8 is a detail view showing the tripping-arm of the lifting-lever acting upon the toe located upon the longitudinally-disposed rock-shaft to disengage the gearing mechanism.

Pivotally mounted upon the frame portion of the machine, within reach of the operator, is the lifting-lever L, which is pivotally connected to an upwardly-extending arm M of the cutting apparatus or some connecting part therewith by means of the flexible connection N, working around the eccentric quadrant O, which is pivotally connected to the coupling-frame H, said flexible connection N fixedly connected to said quadrant O by means of a bolt $a$, as shown in Fig. 4, to maintain its relative working position with said quadrant O. Pivotally connected to the lifting-lever L is a tripping-arm $b$, which fits into an apertured inseparable bracket $c$, located on a longitudinally-disposed rock-shaft $d$, journaled upon suitable bearings at either end, said tripping-arm $b$ contacting with the toe $e$, rigidly connected to and located on said rock-shaft $d$, that when the upper end of the lifting-lever L is drawn backward the tripping-arm $b$ enters said inseparable bracket $c$, contacting with the toe $e$, causing said rock-shaft to rotate. To the rearward end of the rock-shaft $d$ is pivotally connected a horizontally-disposed pull-rod $f$, pivotally connected to the gear-disengaging lever $g$, that when the rock-shaft $d$ is rotated by the contacting of said tripping-arm $b$ with said toe $e$ said gear-disengaging lever $g$, through the medium of the forked shifter $h$, located on a horizontally-disposed supporting-rod $i$, disengages the clutch $j$, located on a horizontally-disposed bevel wheel-shaft $k$, holding said gear mechanism out of engagement. By means of the spring $l$, located on the supporting-rod $i$, acting against one side of the forked shifter $h$, the gear mechanism is thrown into engagement when the lifting-lever L returns to its normal vertical position and the machine is in working order.

Rigidly connected to the frame portion of the machine is a stop P to contact against the coupling-bar J when the cutting apparatus has been raised to a predetermined point by the lifting-lever L from the ground that the cutting apparatus may be raised to a vertical position. Pivotally connected to the lifting-lever L is a lifting-spring rod $m$, extending rearward, on which is mounted a lifting-spring $n$, held on said rod $m$ by the nut $o$, said spring employed to assist the operator to easily lift the cutting apparatus from a horizontal to a vertical position.

The cutting apparatus consists, essentially, of the usual finger-bar Q, reciprocating knife R, and guard-fingers U. To the inner end of the finger-bar Q is rigidly attached the shoe I, to which the coupling-frame H is pivotally connected forward and rearward of the cutters. Pivotally connected to the main frame is the tilting-lever S, which by means of the link T is pivotally connected to the coupling-frame H to tilt the cutting apparatus on the coupling-arm J up and down for high or low cut.

To hold the cutting apparatus firmly when raised to a vertical position and to assist in returning it to its normal horizontal position, I employ a yielding stop, consisting of a stud or pin $p$, supported by the coupling-frame H. Mounted on said stud or pin is a spring $q$, which contacts with said stud or pin $p$ when the bar is raised vertically, compressing said spring $q$ against a shoulder on said stud or pin $p$, causing said stud or pin $p$ to yield with and in the direction of the movement of the finger-bar and to bear firmly against the finger-bar Q when standing in a vertical position, where it is held by the lifting-lever, and when said finger-bar is released by the lifting-lever and it is desired to return the finger-bar Q to its normal working position by the expansion of the spring $q$ on the stud or pin $p$, which bears against and yields in the direction of the movement of said finger-bar, it starts it quickly from a vertical toward a horizontal position.

Figure 11:
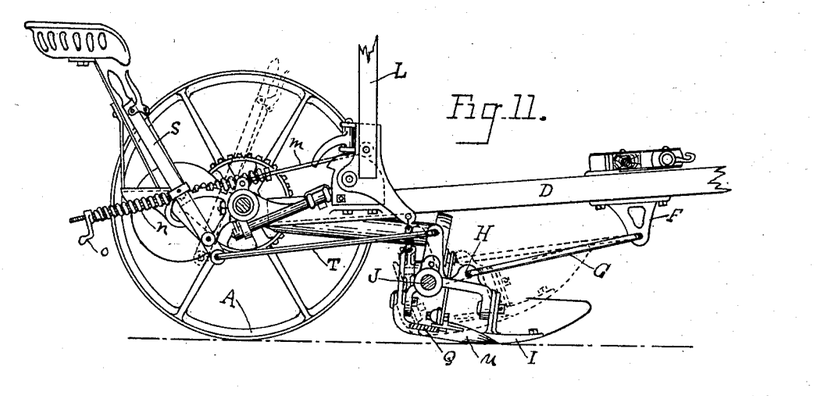
Fig. 11 is a side elevation of a mowing-machine embodying my invention, showing the manner of tilting the guard-fingers of the cutting apparatus upward and downward for cutting close to or high from the ground, the heavy lines showing the guard-fingers tilted down close to the ground for low cutting and the position of the tilting-lever when the guard-fingers are so tilted, the dotted lines showing the position of the guard-fingers when tilted upward for high cutting and the position of the tilting-lever when the guard-fingers are so tilted, also showing the connection of the lifting-spring rod in relation to the lifting-lever and the position of said rod and lifting-spring when the lifting-lever is standing in an upright position and the cutting apparatus on the ground.
Figure 12:
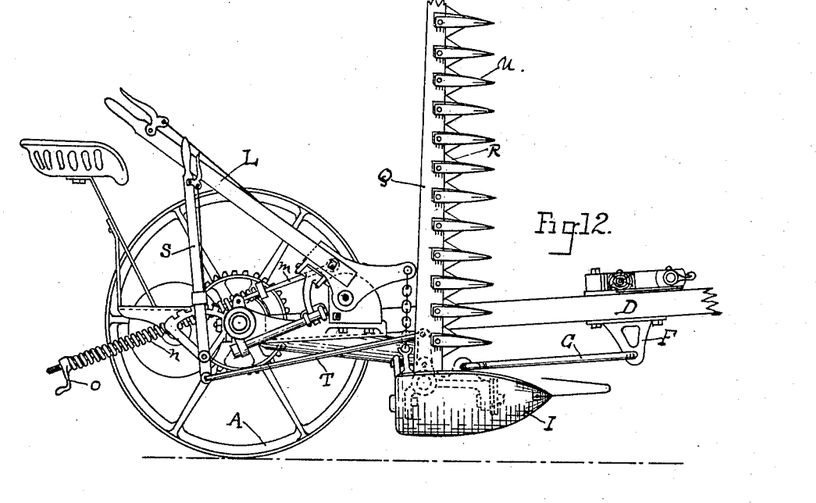
Fig. 12 is a side elevation of a mowing-machine embodying my invention, showing the cutting apparatus in a vertically-inclined position and the position the lifting-lever, lifting-spring rod, and lifting-spring assume when the cutting apparatus is elevated to such position.

It will be observed that the cutting apparatus in this construction is free within certain limits to adapt itself to the undulations and irregularities of the ground independent of the main frame and tongue. The points of the guard-fingers may be tilted upward or downward to enable the operator to cut close to or high from the ground, as shown in Fig. 11. The cutting apparatus is pivotally hinged at its inner end to the main frame C by means of the coupling-frame H and coupling-bar J, the pivotal joint thus formed allowing the inner end of the cutting apparatus to rise or fall independently of the outer end of said cutting apparatus, and the pivotal connection with the main frame allows the cutting apparatus to rise or fall independently of the main frame and tongue.

The lifting-lever L being pivotally mounted upon the frame portion of the machine within reach of the operator and the cutting apparatus flexibly connected with the frame C, a flexible connection becomes necessary between the lifting-lever and cutting apparatus. Said lifting-lever connects in the manner shown in Fig. 2 to an upwardly-extending arm M of the cutting apparatus that the backward movement of the upper end of the lifting-lever will cause said cutting apparatus to assume a vertical position, and by reason of the gear-disengaging mechanism, as shown in detail in Fig. 7, connected to said lifting-lever, as shown in Fig. 7, when the cutting apparatus has reached its highest workable elevation the driving-gear mechanism will be disengaged and remain in that position while the cutting apparatus is elevated above its workable position.

It is necessary and important that in machines using a gear-disengaging mechanism such mechanism be so constructed that it be positive and reliable in its action at all times and under all circumstances and conditions, as any variation in its action by engaging the driving-gear mechanism at a higher point of elevation than the cutters would operate would be serious. It will be observed that I use an apertured inseparable bracket $c$, through which the tripping-arm $b$ is forced by drawing the top of the lifting-lever L backward and downward, and as the tripping-arm $b$ contacts with the toe $e$, forcing it downward to disengage the gearing, it also contacts in its passage through said bracket $c$ with a roller $r$, located on one side of said bracket $c$, said roller holding said tripping-arm $b$ firmly against said toe $e$ in its passage through said bracket and in proper working position under all conditions.

Figures 9, 10:
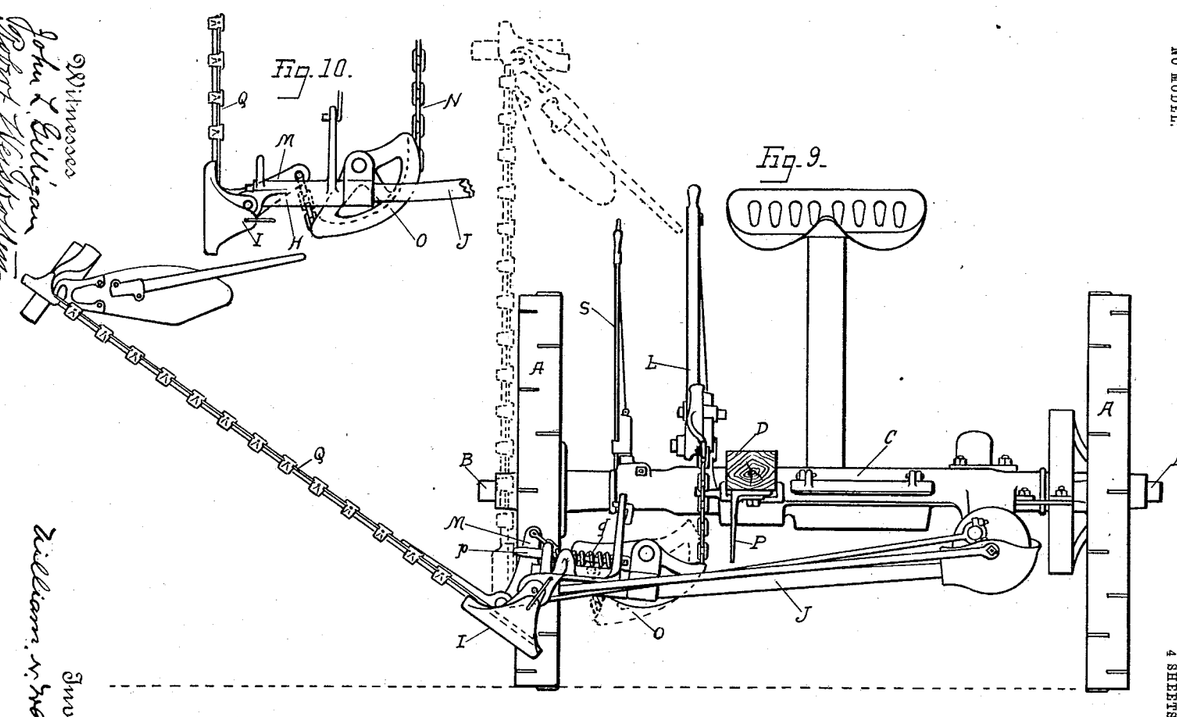
Fig. 9 is a front elevation of a mowing-machine embodying my invention, the heavy lines showing the cutter-bar raised to the point of disengagement of the gearing mechanism, the dotted lines showing the position of the cutter-bar when lifted vertically, also the position of the eccentric quadrant when the finger-bar is in a vertical position.
Fig. 10 is a detail view showing the eccentric quadrant and flexible connection to the cutting apparatus and the position of the quadrant when the finger-bar is standing in a vertical position, the distance from the central pivot of said quadrant to the point in its periphery where the flexible connection is attached to said quadrant being shorter than the distance from its central pivot to the point in its periphery where the flexible connection is acted upon by the lifting-lever, so that when desired the outer end of the finger-bar may be raised before the inner end.

It will be observed that to lift the cutting apparatus from a horizontal to a vertical position I connect an eccentric quadrant with a constantly-varying radius to the coupling-arm that connects the cutting apparatus with the main frame and connect to said quadrant a chain or other flexible device, one end of which connects with an upwardly-extending portion of the inner shoe of the cutting apparatus, the other end of said chain or flexible device being connected to the lifting-lever. The connection between said lifting-lever, quadrant, and cutting apparatus in this construction is such that when the lifting-lever is standing in a vertical position and the cutting apparatus in working position on the ground a certain range of up-and-down movement of the cutting apparatus to allow it to follow the inequalities of the ground is provided for by means of said flexible connection N between the lifting-lever and cutting apparatus, and when it is desired to lift the cutting apparatus the slack in said flexible connection is first taken up by said lifting-lever before any action is exerted on the cutting apparatus. After this slack has been taken up the cutting apparatus is then lifted from the ground either the inner end first, as desired, or the outer end first. If it be the inner end first, after it has been raised until the cutting apparatus contacts with the stop P on the frame portion of the machine the outer end will continue to rise by the action of the lifting-lever until a perpendicular position of the cutting apparatus has been reached, as shown in Figs. 9 and 10. The several parts used in this construction are positive in their action, clean and simple in construction, and work with great efficiency, so that the cutting apparatus of a mowing-machine may be lifted easily and quickly by one operation of the lifting-lever to any position desired from a horizontal to a vertical while the machine is in motion or at rest, and as it is desirable for the operator to have control of the cutting apparatus at all times and in position for cutting, transportation, or passing high obstructions it will be observed that this general system of construction of the machine is very important.

It has been found in practice that to easily and quickly lift the cutting apparatus of a mowing-machine from a horizontal to a vertical position when the machine is at rest or in motion requires a peculiar mechanism from the operator's hand lifting-lever or foot-lever to the cutting apparatus in order to lift the cutting apparatus easily even with the aid of a lifting-spring, and the lifting-spring should operate with more or less force, owing to the different positions the cutting apparatus may assume on the ground. If the cutting apparatus is upon the ground and the outer end of the cutting apparatus is free to rise or fall above a level or the inner end of the cutting apparatus is free to rise or fall, as is necessary in a practical machine, the lifting-spring must be easy and not sufficiently strong to hold the cutting apparatus off the ground when it falls below the usual level, yet at the same time the lifting-spring must be so connected that a greater force is exerted when starting to lift the cutting apparatus from a horizontal to a partial vertical position than after it has assumed a partial vertical position; but it is of equal importance that the connecting parts from the hand lifting-lever to the cutting apparatus be so formed and arranged that the greater force may be exerted where needed in starting to lift the cutting apparatus from a horizontal to a vertical position and a less force exerted when required to give the cutting apparatus a greater movement as it approaches a vertical position. Therefore in order to assist the operator in lifting the cutting apparatus easily and quickly from a horizontal to a vertical position I employ an eccentric quadrant with a constantly-varying radius located between the cutting apparatus and the operator's hand lifting-lever, so that when the cutting apparatus is being lifted at the outer end the greatest force will be exerted by the operator in starting the cutting apparatus from a horizontal to a partial vertical position, and as it inclines toward a vertical position it is easier to lift and moves more rapidly. It will be noticed in my construction that in starting to lift the cutting apparatus from the ground the eccentric quadrant is so arranged that the shorter distance from its periphery to its central pivot of motion is connected to the cutting apparatus, while the longer distance from its periphery to its central pivot of motion is connected to the operator's hand lifting-lever, thus giving the operator the advantage in starting to lift the cutting apparatus from a horizontal to a vertical position, and as the cutting apparatus inclines toward a vertical position the longer end of said eccentric quadrant bears upon the chain or other flexible connection that may be used for this purpose between the cutting apparatus and lifting-lever and turns the cutting apparatus more rapidly and when elevated holds same firmly in that position, while the shorter end of said eccentric quadrant is now drawn upon by the lifting-lever, the eccentric quadrant acting first powerfully but slowly upon the cutting apparatus until it has assumed a vertically-inclined position, after which it exerts a quicker motion to the cutting apparatus, but at no greater expense of force from the operator.

Having thus described my invention, what I claim, and desire to secure by Letters Patent, is—

1. In a mowing-machine of the kind described, in combination, a cutting apparatus, a draw-bar pivotally connected to the tongue portion of the machine and extending rearward, a coupling-frame pivotally connected to said cutting apparatus and draw-bar, a coupling-arm, one end journaled in said coupling-frame, the other end of said arm pivotally connected to the main frame of the machine, means for lifting said cutting apparatus from a horizontal to a vertical position comprising a lever, a gear-disengaging mechanism actuated by the lifting-lever, comprising a tripping-arm connected with the lifting-lever, a rock-shaft longitudinally disposed with the line of draft of the machine and rotated at a predetermined period by said tripping-arm, a horizontally-disposed pull-rod connected to the rearward end of said rock-shaft, a gear-disengaging lever connected to said pull-rod, an automatic gear-clutch-engaging mechanism to engage the driving-gearing when said lifting-lever has assumed a vertical position, and said cutting apparatus a horizontal working position.

2. In a mowing-machine of the kind herein described, in combination, a cutting apparatus, a coupling-frame pivoted to the cutting apparatus, means for lifting said cutting apparatus from a horizontal to a vertical position comprising a lever, a coupling-arm pivotally connected at one end to the main frame of the machine and pivotally connected at the other end to the coupling-frame, said means comprising an eccentric quadrant with a constantly-varying radius pivotally connected to said coupling-arm, a flexible connection between said lifting-lever and cutting apparatus and extending partially around said quadrant; said eccentric quadrant and said flexible connection fixedly connected together at a point about midway the arc of said quadrant, the elongated arm of the quadrant engaging that portion of the flexible connection which extends to the cutting apparatus whereby in the movement of said lifting-lever rearward, the length of said flexible connection is taken up more rapidly as the cutting apparatus approaches a vertical position.

3. In a mowing-machine of the kind herein described, in combination, a lifting-lever pivotally mounted upon the frame portion of the machine, a tripping-arm pivotally connected to said lifting-lever, a rock-shaft longitudinally disposed with the line of draft of the machine and pivotally connected to the frame portion of the machine, a toe secured to the forward end of said rock-shaft and operated by said tripping-arm, a horizontally-disposed pull-rod connected to the rearward end of said rock-shaft, a gear-clutch-shifting lever pivotally connected to said pull-rod, said parts coacting to disengage the gearing in the act of lifting the cutting apparatus, an automatic gear-engaging mechanism to engage said gearing when said rock-shaft is released from the action of said tripping-arm.

4. In a mowing-machine of the kind described, in combination, a cutting apparatus, a coupling-frame, a shoe secured to the finger-bar of said cutting apparatus and pivotally connected to said coupling-frame, a lifting-lever pivotally mounted upon the frame portion of the machine, a yielding stop located on said coupling-frame, said stop yielding with and in the direction of the movement of the finger-bar when coming in contact with said stop as said bar approaches a vertical position, said stop acting to force the finger-bar downward toward a horizontal position when released by said lifting-lever.

5. In a mowing-machine of the kind described, in combination, a cutting apparatus, a lifting-lever pivotally mounted upon the frame portion of the machine, a flexible connection between said lifting-lever and cutting apparatus, a tripping-arm pivotally connected to said lifting-lever, an apertured inseparable bracket into which said tripping-arm extends when said lifting-lever is drawn backward, a rock-shaft longitudinally disposed with the line of draft of the machine, a toe secured to the forward end of said shaft to turn said shaft when acted upon by said tripping-arm through said apertured bracket, a gear-clutch mechanism, said tripping-arm and said toe held in engagement to hold said gear-clutch mechanism out of engagement at the time desired and for the purpose specified.

6. In a mowing-machine of the kind described, in combination, a driving-gear mechanism supported by the main frame of the machine, reciprocating cutters operated by said gearing, a lifting-lever pivotally mounted upon the frame portion of the machine, a rock-shaft longitudinally disposed and supported by the frame portion of the machine, a toe secured to the forward end of said rock-shaft and moving transversely with the line of said shaft, a gear-clutch mechanism, a tripping-arm connected to said lifting-lever and occasionally engaging with said toe on said shaft to rotate said shaft to positively disengage said gear-clutch, an automatic gear-engaging mechanism to engage and hold said clutch in engagement when released by said tripping-arm.

7. In a mowing-machine of the kind described, in combination, a lifting-lever pivotally mounted upon the frame portion of the machine, a tripping-arm connected to said lifting-lever, a rock-shaft longitudinally disposed with the line of draft of the machine, a toe secured to the forward end of said rock-shaft, an apertured inseparable bracket supporting the forward end of said rock-shaft, and into which said tripping-arm enters at a predetermined movement of said lifting-lever, contacting with said toe to pivotally turn said shaft to disengage the gear-clutch as the cutting apparatus is raised toward a vertical position, a gear-clutch mechanism, an automatic gear-engaging mechanism to engage said gear-clutch when said bar is lowered and reaches a predetermined point before the cutting apparatus reaches a horizontal position.

8. In a mowing-machine of the kind described, in combination, a lifting-lever pivotally mounted upon the frame portion of the machine, a tripping-arm connected to said lifting-lever, a rock-shaft longitudinally disposed with the line of draft, an apertured inseparable bracket through which said tripping-arm passes to disengage the driving-gear mechanism, a gear-clutch mechanism, a toe secured to the forward end of said rock-shaft to close the aperture in said bracket when said gear-clutch mechanism is in engagement, said toe moved to one side of the aperture in said bracket by said tripping-arm to positively disengage the gear-clutch mechanism as the cutting apparatus approaches a vertical position.

9. In a mowing-machine of the kind described, in combination, a cutting apparatus, a coupling-frame pivoted to the cutting apparatus, means for lifting said cutting apparatus from a horizontal to a vertical position, a coupling-arm pivotally connected at one end to the main frame of the machine and pivotally connected at the other end to the coupling-frame, said lifting means comprising a lifting-lever pivotally mounted upon the frame portion of the machine, an upward-extending portion of the main shoe of the cutting apparatus above its hinge-pivot, a flexible connection between said lifting-lever and said upward-extending portion of the shoe of the cutting apparatus, an eccentric quadrant with a constantly-varying radius pivotally mounted upon the coupling-arm, said flexible connection and said eccentric quadrant fixedly connected together at a point about midway the arc of said quadrant, the elongated arm of said quadrant engaging that portion of said flexible connection which extends to the cutting apparatus whereby to quickly lift said cutting apparatus as it approaches a vertical position.

10. In a mowing-machine of the kind described, in combination, a cutting apparatus, a coupling-frame pivoted to said cutting apparatus, means for lifting said cutting apparatus from a horizontal to a vertical position, an upward-extending portion of the main shoe of said cutting apparatus, a coupling-arm pivotally connected at one end to the frame portion of the machine and at the other end connected to the coupling-frame, said lifting means comprising a lifting-lever pivotally mounted upon the frame portion of the machine, an eccentric quadrant with a constantly-varying radius pivotally connected to said coupling-arm, a flexible connection between said upward-extending portion of the inner shoe of said cutting apparatus and said lifting-lever and partially extending around said quadrant and fixedly connected thereto at a point about midway the arc of said quadrant, a tripping-arm pivotally connected to said lifting-lever, a rock-shaft longitudinally disposed with the line of draft of the machine and pivotally connected to the main frame, a toe secured to the forward end of said shaft to cause said rock-shaft to rotate when acted upon by said tripping-arm, a gear-clutch mechanism, a connection between said rock-shaft and said gear-clutch mechanism to disengage said gear-clutch mechanism, a spring to automatically engage said gear-clutch mechanism and to hold same in engagement when the cutting apparatus has assumed a horizontal position.

11. In a mowing-machine of the kind described, in combination, a coupling-arm pivotally connected at one end to the main frame and at the other end connected to the coupling-frame, a coupling-frame pivotally connected to one end of said arm and rotative thereon, a cutting apparatus provided with a main shoe which is pivotally connected to said coupling-frame, an upward-extending portion of the main shoe of said cutting apparatus, a lifting-lever pivotally mounted upon the frame portion of the machine, an eccentric quadrant with a constantly-varying radius pivotally connected to said coupling-arm, a flexible connection between said lifting-lever and said upward-extending portion of said shoe and extending partially around said quadrant and fixedly attached to said quadrant about midway the arc of said quadrant, the elongated end of said quadrant engaging that portion of the flexible connection which extends to the cutting apparatus drawing said flexible connection downward and rapidly raising the cutting apparatus as it approaches a vertical position and holding it firmly when elevated.

12. In a mowing-machine of the kind described, in combination, a coupling-arm pivotally connected at one end to the frame portion of the machine, a coupling-frame journally mounted upon the opposite end of said coupling-arm and rotative thereon, a cutting apparatus pivotally connected to said coupling-frame, a lifting-lever pivotally mounted upon the frame portion of the machine, an upward-extending portion of the main shoe of the cutting apparatus, a flexible connection between said lifting-lever and said upward-extending portion of said shoe, an eccentric quadrant with a constantly-varying radius pivotally connected to said coupling-arm, said flexible connection fixedly connected to said quadrant, a stop to prevent the further upward movement of the inner end of said cutting apparatus when first acted upon by said lifting-lever, the shorter end of said quadrant engaging that portion of the flexible connection which is connected to said lifting-lever and the elongated arm of the quadrant engaging that portion of the flexible connection which extends to the cutting apparatus whereby upon the continued rearward movement of said lifting-lever the longer end of said quadrant will take up said flexible connection more rapidly to lift said cutting apparatus to a vertical position.

13. In a mowing-machine of the kind described, in combination, a cutting apparatus, a draw-bar pivotally connected to the tongue portion of the machine and extending rearward and connecting to said coupling-frame part of the machine and forming the only support from backward movement of said cutting apparatus, a coupling-frame pivotally connected to said cutting apparatus and draw-bar, a coupling-arm pivotally connected to the main frame of the machine at one end and at the other end connected to the coupling-frame and on which said coupling-frame rotates, forming one pivotal connection only to the main frame and one pivotal connection only from the cutting apparatus to the tongue portion of the machine for propelling the cutting apparatus over the ground, an upward-extending portion of the main shoe of said cutting apparatus, a lifting-lever pivotally mounted upon the frame portion of the machine, a flexible connection from said upward-extending portion of the shoe of said cutting apparatus to said lifting-lever, an eccentric quadrant with a constantly-varying radius pivotally mounted upon said coupling-arm, said flexible connection between said shoe and said lifting-lever being attached to the under side of said eccentric quadrant, the elongated end of said quadrant acting directly on that portion of said flexible connection which extends to the cutting apparatus to quickly lift and hold the cutting apparatus in a vertical position.

14. In a mowing-machine of the kind described, in combination, a tongue, a cutting apparatus, a draw-bar from said tongue to sustain said cutting apparatus in its forward movement, a coupling-frame, a coupling-arm, an eccentric quadrant with a constantly-varying radius pivotally mounted upon said coupling-arm, an upward-extending portion of the main shoe of the cutting apparatus, a lifting-lever pivotally mounted upon the frame portion of the machine, a flexible connection between the arm on the main shoe of said cutting apparatus and said lifting-lever, said flexible connection rigidly secured to said quadrant at a point about midway the arc of said quadrant, a balancing-spring rod pivotally connected to said lifting-lever, a balancing-spring supported by said rod to assist in turning said quadrant to lift said cutting apparatus from a horizontal to a vertical position, the several parts coacting to propel said cutting apparatus over the ground and lift it into a vertical position, a gear-clutch mechanism, a gear-disengaging mechanism and connections whereby it is operated from the pivoted lifting-lever to positively disengage the gearing at a predetermined height of the cutting apparatus from the ground, an automatic gear-engaging mechanism to engage the gear-clutch when the cutting apparatus is being returned to a horizontal position.

15. In a mowing-machine of the kind described, in combination, a cutting apparatus, a lifting-lever pivotally mounted on the frame portion of the machine, a flexible connection between said cutting apparatus and said lifting-lever, a tripping-arm pivotally connected to said lifting-lever, a rock-shaft longitudinally disposed with the line of draft of the machine and pivotally supported by the frame portion of the machine, a toe secured to the forward end of said rock-shaft, a pull-rod connected to the rearward end of said rock-shaft, a gear-clutch mechanism, a gear-clutch lever pivotally connected to said pull-rod and to a member of the clutch, said parts coöperating to disengage the driving-gear clutch mechanism by means of the backward movement of said lifting-lever, an automatic gear-clutch-engaging mechanism to engage said gear-clutch when said lifting-lever has been returned to the same point of disengagement.

16. In a mowing-machine of the kind described, in combination, a cutting apparatus, a lifting-lever mechanism pivotally mounted upon the frame portion of the machine, a coupling-frame pivotally connected to said cutting apparatus, a coupling-arm, one end pivotally connected to the frame portion of the machine, the other end pivotally connected to said coupling-frame and on which said frame rotates, an eccentric quadrant with a constantly-varying radius pivotally mounted upon said coupling-arm, a flexible connection between said lifting-lever and said cutting apparatus and extending partially around said quadrant and fixedly connected thereto at a point about midway the arc of said quadrant to turn said quadrant to lift the cutting apparatus from a horizontal to a vertical position by one movement of said lifting-lever.

17. In a mowing-machine of the kind described, in combination, a lifting-lever mechanism pivotally mounted upon the frame portion of the machine, an upward-extending portion of the shoe of the cutting apparatus, a coupling-frame pivoted to the cutting apparatus, a coupling-arm pivotally connected at one end to the frame portion of the machine and connected at the other end to said coupling-frame on which said frame rotates, an eccentric quadrant with a constantly-varying radius pivotally mounted upon said coupling-arm, a flexible connection between said lifting-lever mechanism and the upward extension on the shoe and extending partially around said quadrant and fixedly attached to said quadrant about midway the arc of said quadrant, a tripping-arm pivotally connected to said lifting-lever, a rock-shaft longitudinally disposed and supported by the frame portion of the machine, an apertured inseparable bracket pivotally supporting the forward end of said rock-shaft, a toe secured to the forward end of said rock-shaft and operated by said tripping-arm, a horizontally-disposed pull-rod pivotally connected to the rearward end of said rock-shaft, a gear-clutch mechanism, a gear-clutch lever pivotally connected to said pull-rod and to a member of the clutch; all of said parts coöperating, as shown and described, to control said cutting apparatus and to disengage the driving-gear at a predetermined elevation of the cutting apparatus.

18. In a mowing-machine of the kind described, in combination, a main shoe of the cutting apparatus, an upward-extending portion of said shoe, a coupling-arm, one end pivotally connected to the main frame, the other end pivotally connected to the coupling-frame, a coupling-frame pivotally connected to the cutting apparatus and rotatively connected to the coupling-arm, an eccentric quadrant with a constantly-varying radius pivotally connected to said coupling-arm, a lifting-lever pivotally mounted upon the frame portion of the machine, a flexible connection between said lifting-lever and said upward-extending portion of said shoe of the cutting apparatus and extending partially around said quadrant and fixedly attached thereto at a point about midway the arc of said quadrant, a rock-shaft longitudinally disposed with the line of draft and pivotally connected to the frame portion of the machine, a tripping-arm pivotally connected to said lifting-lever, a toe secured to the forward end of said rock-shaft and operated by said tripping-arm to rotate said shaft, a pull-rod pivotally connected to the rearward end of said rock-shaft, a gear-clutch mechanism, a gear-clutch lever pivotally connected to a member of the gear-clutch to disengage the driving-gear for the cutting apparatus at a predetermined elevation of said cutting apparatus, an automatic gear-engaging mechanism to engage the driving-gear for the cutting apparatus at a predetermined point when the cutting apparatus passes from a vertical to a horizontal position.

19. In a mowing-machine of the kind described, in combination, a cutting apparatus, a lifting-lever for same pivotally mounted upon the main-frame portion of the machine, a flexible connection between said cutting apparatus and said lifting-lever, a coupling-frame pivotally connected to said cutting apparatus, a coupling-arm pivotally connected at one end to the main frame, its opposite end connected to said coupling-frame, a yielding spring-actuated stop on said coupling-frame for the finger-bar of the cutting apparatus to bear against when brought to a vertical position by said lifting-lever and connections, said spring-stop to move said finger-bar downward when released from the action of said lifting-lever.

20. In a mowing-machine of the kind described, in combination, a lifting-lever mechanism pivotally mounted upon the frame portion of the machine to lift the cutting apparatus from a horizontal to a vertical position, a coupling-arm, one end pivotally connected to the main frame, the other end pivotally connected to the coupling-frame, a coupling-frame pivotally connected to the cutting apparatus and rotatively connected to said coupling-arm, an eccentric quadrant with a constantly-varying radius pivotally connected to said coupling-arm, a flexible connection between said lifting-lever and cutting apparatus and extending partially around said quadrant and fixedly connected thereto, a gear-disengaging mechanism and connections between said lifting-lever and driving-gear mechanism to positively disengage the driving-gear mechanism by one continuous movement of said lifting-lever.

In testimony whereof I affix my signature in presence of two witnesses.

WILLIAM N. WHITELY.

Witnesses:
JOHN L. GILLIGAN,
ROBERT WEISKOTTEN.